July 16, 1957 C. W. VARVEL 2,799,165
APPARATUS FOR MEASURING FLOW
Filed Aug. 24, 1953

INVENTOR.
C. W. VARVEL

BY
Hudson & Young
ATTORNEYS

United States Patent Office 2,799,165
Patented July 16, 1957

2,799,165

APPARATUS FOR MEASURING FLOW

Charles W. Varvel, Bartlesville, Okla., assignor to Phillips Petroleum Company, a corporation of Delaware Application August 24, 1953, Serial No. 375,853

3 Claims. (Cl. 73—204)

This invention relates to apparatus for measuring flow. In another aspect, it relates to an indicating circuit particularly adapted for flow measurement.

Heretofore, many different types of flowmeters have been devised and extensively used by industry. In one type of flowmeter, an indirect measurement is obtained by determining a pressure differential or velocity which is a function of the quantity of fluid passing through a conduit with which the measuring device is associated. Alternatively, the volume or weight of fluid passing through a conduit has been measured directly. In general, instruments of the latter type are more complicated and expensive than instruments of the former type.

Considerable difficulties have been encountered in the measurement of fluid flow with such devices. For example, some flowmeters must be calibrated for each type of fluid whose flow rate is to be measured and, in conduits of large size, the calibration equipment required is both cumbersome and expensive. It has also been proposed to measure fluid by injecting radioactive material into a conduit and measuring the time required for the radioactive material to traverse a measured length of the conduit. Such a method of flow measurement obviously requires apparatus for injecting radioactive material into the conduit together with rather expensive radiation detecting devices at other parts of the conduit. Even when used in minute amounts, the radioactive material may have a deleterious effect upon the fluids transported through the conduit.

In accordance with this invention, the rate of flow of fluid is measured without diversion or interruption of the fluid stream, and no extraneous material need be injected into the stream in order to make the flow measurement.

Accordingly, it is an object of the invention to provide an improved apparatus for measuring flow without diversion, interruption, or contamination of the fluid stream.

It is a further object to accomplish the foregoing purpose with relatively inexpensive equipment which can be installed at low cost and is very reliable in operation.

It is a still further object to provide an improved timing circuit adapted for use in flowmeters of the character noted above.

Figure 1:
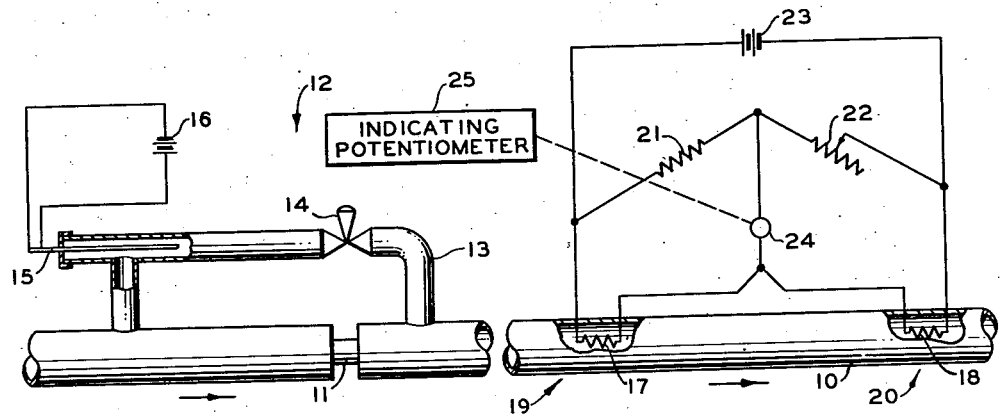
Figure 2:
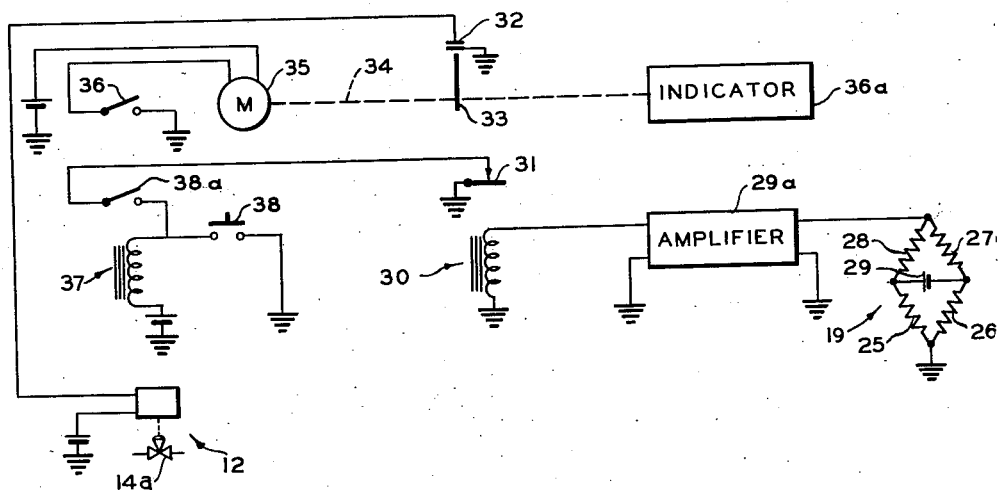

Various other objects, advantages and features of the invention will become apparent from the following detailed description taken in conjunction with the accompanying drawings, in which:

Figure 1 is a view illustrating the flowmeter of my invention with the electrical circuit elements indicated schematically; and Figure 2 is a schematic circuit diagram of a modification of the invention.

Referring now to Figure 1, I have shown a conduit 10 which may be a process line in a chemical plant, a pipe line, or any other fluid transporting medium. Fluid flows through this conduit in the direction indicated by the arrows. A restricting means, such as an orifice 11, is positioned within the conduit at a predetermined location 12. The orifice 11 is bypassed by a line 13 in which is disposed a valve 14, preferably of the quick-operating type. A temperature changing device, such as an electrical heater 15, is disposed in line 13 upstream of valve 14, and this heater is supplied with current by a battery 16 or other suitable current source. As will become evident hereinafter, temperature-changing device 15 can be either a heater or a cooler, the purpose being to effect an appreciable change in the temperature of the fluid within line 13 as compared to the prevailing temperature of the fluid passing through conduit 10. Although an electrical heater of the type shown is most convenient, an induction heater, an indirect heat exchanger, or other type of heater can be used in some applications of the invention.

A pair of thermosensitive devices 17 and 18 are disposed within the conduit at two locations 19 and 20 downstream of the location 12. Preferably, each thermosensitive element is a Thermistor, the electrical impedance of which is representative of its temperature. Thermocouples or thermopiles can also be used and, in the broader aspects of the invention, non-electrical temperature-indicating devices are suitable. The elements 17 and 18, in the preferred embodiment of the invention, are connected by suitable leads in circuit with a fixed balancing impedance 21 and a variable balancing impedance 22 so as to form a Wheatstone bridge circuit. A battery or other current source 23 is connected across two opposite corners of the bridge, and an indicator 24 is connected across the other pair of opposite corners of the bridge. Indicator 24 can advantageously be connected to the input circuit of an indicating potentiometer 25 so as to continuously record the bridge output.

In operation, the bridge circuit is balanced with the elements 17, 18 at the prevailing temperature of the fluid passing through the conduit. A portion of the fluid passing through conduit 10 accumulates in the portion of line 13 upstream of valve 14, and this accumulated fluid is heated by unit 15 to a tempertture higher than the prevailing temperature of the fluid in conduit 10. Thereupon, valve 14 is momentarily actuated, thus discharging a quantity or "slug" of heated fluid into the conduit. This heated fluid passes downstream, rapidly diffusing throughout the cross-section of the pipeline, so that its velocity becomes that of the pipeline fluid, and successively contacts elements 17, 18, producing successive output signals at the bridge circuit at the time it transverses each of the sensitive elements. The interval between the signals is, of course, directly indicative of the time taken by the heated fluid to traverse the distance between elements 17 and 18, i. e., the flow rate. In this manner, I obtain a direct measurement of the rate of flow without diversion, interruption, or contamination of the fluid stream.

It will be evident that, if heater 15 is replaced by a cooler, the temperature changes at the locations 19 and 20 will be similarly detected, and a direct indication of flow rate will be obtained. Further, although it is preferable that the heated fluid be abruptly injected into the conduit by a momentary operation of valve 14, it is within the purview of the invention to inject the heated fluid over a relatively long interval of time. In this case, the arrival of the heated fluid at location 19 unbalances the bridge circuit which again becomes balanced in an abrupt manner as the heated fluid reaches location 20, it being assumed, in this instance, that the heated fluid is present at element 17 at the time the first portion of heated fluid reaches element 18.

In the apparatus as just described, it will be noted that the heated fluid traverses two spaced locations both downstream of the location at which the heated fluid is injected, the flow rate between these spaced locations being determined by the time required for the heated fluid to traverse the distance between them. It is also possible, in accordance with the invention, to measure the time interval between the injection of the fluid and the time at which the heated fluid reaches a location downstream of the injection point. Such a system is illustrated in Figure 2 wherein a single temperature-sensitive element 25 is positioned at location 19 downstream of the location 12 at which the fluid is injected. Thermosensitive element 25 is connected in a Wheatstone bridge circuit with balancing impedances 26, 27, 28, and a battery 29. The output of the bridge circuit thus defined is fed through an amplifier 29a to the operating winding of a relay 30 having a set 31 of normally closed contacts.

A solenoid valve 14a is disposed at location 12 in the manner described in connection with the valve 14 of Figure 1. The operating winding of solenoid valve 14a is connected in circuit with a contact set 32 actuated by a cam 33 fixed to a shaft 34 of a timing motor 35. Shaft 34 is mechanically connected to an indicator 36a in such fashion as to indicate or record the time of motor operation.

The operating circuit of motor 35 includes a normally open contact set 36 of a relay 37. This relay has an operating winding which is connected in circuit with a momentarily-operating switch 38, such as a push button. Relay 37 is further provided with a set 38 of normally open contacts which define a holding circuit in conjunction with the normally closed contact set 31 and the operating winding of relay 37.

In the operation of the flowmeter of Figure 2, switch 38 is actuated, thereby energizing relay 37 and closing its holding circuit. The resulting closure of contacts 36 initiates operation of motor 35, and the beginning of a time period is indicated by unit 36a. The initial rotation of shaft 35 causes a momentary closure of contacts 32 by action of cam 33 thereby causing a momentary actuation of solenoid valve 14a which discharges a portion of heated fluid into the conduit at location 12, Figure 1. Thus, indicator 36a shows the time at which the heated fluid is injected into the conduit by valve 14a.

When the heated fluid reaches location 19, the Wheatstone bridge circuit is momentarily unbalanced, thereby feeding a signal to amplifier 29a and causing a momentary actuation of relay 30. The resulting opening of contacts 31 breaks the holding circuit of relay 37, thus opening contacts 36 and terminating the operation of motor 35. The time at which this occurs is shown by indicator 36a.

Thus, from indicator 36, the time required for the heated fluid to traverse the distance from location 12 to location 19 is determined, and this time is directly indicative of the flow rate through conduit 10, Figure 1. Motor 35 is then reset, either manually or automatically, to its original position and the system is in readiness for a new cycle of operation. It will be understood, of course, that the system of Figure 2 is subject to the same variations as the system of Figure 1, particularly with regard to the substitution of a cooler for heater 15, or the use of various types of temperature-sensing elements.

Where the pipeline flow is turbulent, the heated fluid, when injected into the pipeline, as stated, rapidly diffuses throughout the cross section of the pipeline so that its velocity becomes the same as that of the pipeline fluid within a short interval of time. While this diffusion is taking place, the velocity of the heated body of fluid may differ slightly from that of the pipeline fluid. Consequently, with turbulent flow, the modification shown in Figure 2 is less preferable than that of Figure 1 since a small error can be induced with the Figure 2 modification resulting from the slight difference in velocity between the heated fluid and the pipeline fluid at the location where the heated fluid is introduced. Where the flow through the pipe is streamlined, advantage can be taken of the fact that the velocity of the heated body of fluid is different from that of the pipeline fluid, and a velocity profile can be obtained by positioning the detecting element close to the injecting station, and moving the detector element across the cross section of the pipeline.

One important use of the flowmeter of this invention is the control of fluid through a pipeline "loop," where a pipeline branches into two sections which are joined together at a point downstream of the branch location. In this instance, two flowmeters of the type described herein can be placed at equal distances downstream of the branch location, these instruments cooperating to produce an output signal when the flow rate in one pipe differs from that in the other pipe. This signal can actuate a rate of flow controller in one of the branches so as to maintain equal flow rates in both sections of the pipeline.

While the invention has been described in connection with a present, preferred embodiment thereof, it is to be understood that this description is illustrative only and is not intended to limit the invention.

I claim:

1. Apparatus for measuring flow which comprises, in combination, a conduit, means for passing fluid through said conduit, means defining a restriction in said conduit, a line bypassing said restriction, a valve in said line, a heater in said line upstream of said valve, said heater being actuatable to heat the fluid in the portion of said line upstream of the valve, said valve being operable to discharge the thus heated fluid into the conduit, a temperature-sensitive element positioned in said conduit at a location downstream of said bypass line, and an indicator cooperating with said temperature-responsive device to indicate the time of passage of heated fluid past said temperature-responsive device.

2. Apparatus for measuring flow which comprises, in combination, a conduit, means for passing fluid through said conduit, means defining a restriction in said conduit, a line bypassing said restriction, a valve in said line, a heater in said line upstream of said valve, said heater being actuatable to heat the fluid in the portion of said line upstream of the valve, said valve being operable to discharge the thus heated fluid into the conduit, a pair of thermoresponsive elements positioned in said conduit at spaced locations downstream of said bypass line, the electrical impedance of said elements varying with temperature, a pair of balancing impedances, leads connecting said balancing impedance in a Wheatstone bridge circuit with said thermoresponsive elements, a current source connected across the two opposite corners of the thus defined Wheatstone bridge, and an indicator connected across the other opposite corners of said Wheatstone bridge.

3. Apparatus for measuring flow which comprises, in combination, a conduit, means for passing fluid through said conduit, means defining a restriction in said conduit, a line bypassing said restriction, a valve in said line, a heater in said line upstream of said valve, said heater being actuatable to heat the fluid in the portion of said line upstream of the valve, said valve being operable to discharge the thus heated fluid into the conduit, a thermoresponsive element positioned in said conduit downstream of said bypass line, means including a relay actuatable by said element in response to increase in fluid temperature above a predetermined value, a timing circuit operatively connected to said valve to indicate the time of actuation thereof, and additional means forming a part of said timing circuit and responsive to operation of said relay to indicate the time of actuation of said relay.

References Cited in the file of this patent

UNITED STATES PATENTS

| | | |
|---|---|---|
| 2,015,249 | Benesh | Sept. 24, 1935 |
| 2,344,771 | Halliburton | Mar. 21, 1944 |
| 2,501,960 | Olson | Mar. 28, 1950 |
| 2,536,082 | Perkins | Jan. 2, 1951 |
| 2,603,089 | Morley | July 15, 1952 |

FOREIGN PATENTS

| | | |
|---|---|---|
| 649,030 | Great Britain | Jan. 17, 1951 |